United States Patent
You et al.

(10) Patent No.: US 10,877,481 B2
(45) Date of Patent: Dec. 29, 2020

(54) AUTONOMOUS DRIVING CONTROL SYSTEM AND CONTROL METHOD USING THE SAME

(71) Applicants: Hyundai Motor Company, Seoul (KR); Kia Motors Corporation, Seoul (KR)

(72) Inventors: Byung Yong You, Gyeonggi-do (KR); Young Chul Oh, Gyeonggi (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 369 days.

(21) Appl. No.: 15/875,477

(22) Filed: Jan. 19, 2018

(65) Prior Publication Data
US 2018/0292833 A1 Oct. 11, 2018

(30) Foreign Application Priority Data
Apr. 5, 2017 (KR) .......... 10-2017-0044015

(51) Int. Cl.
*G05D 1/02* (2020.01)
*B60W 50/00* (2006.01)
(Continued)

(52) U.S. Cl.
CPC ......... *G05D 1/0214* (2013.01); *B60W 30/182* (2013.01); *B60W 40/02* (2013.01);
(Continued)

(58) Field of Classification Search
CPC .. G05D 1/0214; G05D 1/0212; G05D 1/0274; G05D 1/0088; G05D 2201/0213;
(Continued)

(56) References Cited

U.S. PATENT DOCUMENTS

| | | | | |
|---|---|---|---|---|
| 2014/0019041 A1* | 1/2014 | Kluge | ........... | G01C 21/3469 701/430 |
| 2015/0097866 A1* | 4/2015 | Mochizuki | ........... | G09G 5/38 345/633 |

(Continued)

FOREIGN PATENT DOCUMENTS

| | | |
|---|---|---|
| JP | 5777974 B2 | 9/2015 |
| JP | 2016-057655 A | 4/2016 |

(Continued)

*Primary Examiner* — Marthe Y Marc-Coleman
(74) *Attorney, Agent, or Firm* — Mintz Levin Cohn Ferris Glovsky and Popeo, P.C.; Peter F. Corless (57) ABSTRACT

An autonomous driving control method of a vehicle is provided. The method includes recognizing accuracy of a map within the vehicle and determining an available autonomous driving level. Sensor coverage of the vehicle is recognized and an available autonomous driving level for each section among the available autonomous driving levels is determined. A path with autonomous driving level indicated thereon among driving paths is then recommended according to a destination set in the map, and autonomous driving level calculation information is updated in real-time according to a selected path and autonomous information is provided to a driver.

18 Claims, 7 Drawing Sheets

(51) Int. Cl.
*B60W 50/14* (2020.01)
*B60W 40/02* (2006.01)
*B60W 30/182* (2020.01)
*G01C 21/30* (2006.01)
*G01C 21/34* (2006.01)
*G05D 1/00* (2006.01)

(52) U.S. Cl.
CPC ........ *B60W 50/0097* (2013.01); *B60W 50/14* (2013.01); *G01C 21/30* (2013.01); *G01C 21/3407* (2013.01); *G05D 1/0088* (2013.01); *G05D 1/0212* (2013.01); *G05D 1/0274* (2013.01); *B60K 2370/172* (2019.05); *B60W 2050/0072* (2013.01); *B60W 2552/00* (2020.02); *B60W 2554/00* (2020.02); *B60W 2555/20* (2020.02); *B60W 2556/50* (2020.02); *G05D 2201/0213* (2013.01)

(58) Field of Classification Search
CPC .. B60W 50/0097; B60W 50/14; B60W 40/02; B60W 2550/14; B60W 2550/402; B60W 2550/12; B60W 2050/0072; B60W 2550/20; B60W 40/00; G01C 21/30; G01C 21/3407; B60K 2370/172

USPC .......................................................... 701/23
See application file for complete search history.

(56) References Cited

U.S. PATENT DOCUMENTS

| | | | |
|---|---|---|---|
| 2015/0134176 A1* | 5/2015 | Ham | G01C 21/28 701/23 |
| 2017/0329019 A1* | 11/2017 | Croyle | G01C 21/165 |
| 2017/0371349 A1* | 12/2017 | Kim | G08G 1/164 |
| 2018/0134285 A1* | 5/2018 | Cho | G06K 9/00845 |

FOREIGN PATENT DOCUMENTS

| | | | | |
|---|---|---|---|---|
| JP | 2016-182887 A | 10/2016 | | |
| JP | 2016-183727 A | 10/2016 | | |
| JP | 2016-183728 A | 10/2016 | | |
| KR | 10-2016-0057756 | 5/2016 | | |
| KR | 2016-0131579 A | 11/2016 | | |
| KR | 20160131579 A * | 11/2016 | ........ | B60W 30/0956 |

* cited by examiner

(1) Navigation map (2) ADAS map (3) HD map (1) Navigation map : Level 1
(2) ADAS map : Level 1 ~ Level 2
(3) HD map : Level 1 ~ Level 4

FIG. 3A (A) LIMIT LEVER 2
(ACC, LKA)

FIG. 3B (B) LIMIT LEVER 3
(NO CHANGE HIGHWAY LANE)

(C) LEVER 4 IS POSSIBLE
(ACTIVATE ALL FUNCTIONS)

| BASIC LEVEL ELEMENT | LEVEL 4 | LEVEL 3 | LEVEL 2 | LEVEL 1 |
|---|---|---|---|---|
| LANE MARKING DEGREE | GOOD | INTERMITTENT ERASURE | MANY CRACKS | NO MARKING |
| ACCIDENT BLACKSPOT | NONE | ONE OR MORE PER KM | THREE OR MORE PER KM | MANY |
| CROSSROAD COMPLEXITY | SIMPLE | LEFT-TURN 2-LANE | LEFT-TURN 3-LANE | NO SIGNAL LIGHT |
| TOTAL LANE NUMBER | WITHIN 2-LANE | 3-LANE | 4-LANE | 4-LANE EQUAL OR GREATER |
| TRAFFIC LIGHT COGNITION | NONE | SIMPLE LED | INCREASE IN COGNITION DISTANCE | POSITION ERROR |
| LIMITED SPEED | 110 KPH | 80 KPH | 60 KPH | 40 KPH |
| ROAD CLASSIFICATION | HIGHWAY | LOCAL ROAD | DOWNTOWN ROAD | NOT CLASSIFIED |
| LOCATION COGNITION DEGREE | NOT REQUIRED | ~30 CM | ~1 m | ~3m |
| SURROUNDING ISSUES | NO ISSUE | TOLLGATE | JC/IC | UNDER CONSTRUCTION |

FIG. 5

| LEVEL CALCULATION ELEMENT | | LEVEL 4 | LEVEL 3 | LEVEL 2 | LEVEL 1 | LEVEL 0 |
|---|---|---|---|---|---|---|
| MAP | | HD MAP (ACCURACY < 0.3 M) | | ADAS MAP (<1.0M) | Navigation MAP (<3.0M) | |
| Sensor Coverage | FRONT | 150 M OR MORE | 100 M OR MORE | 100 M OR MORE | | |
| | FRONT SIDE | 100 M OR MORE | 100 M OR MORE | 50 M OR MORE | 10 M OR MORE | |
| | REAR SIDE | 100 M OR MORE | 100 M OR MORE | 70 M OR MORE | 30 M OR MORE | |
| | REAR | 100 M OR MORE | 100 M OR MORE | | | |
| DRIVING PATH | | HIGHWAY, MOTORWAY, AUTONOMOUS DRIVEWAY | DOWNTOWN AREA CONTAINING CROSSROAD, TWO OR MORE LEFT-TURN ROADWAYS | MAIN ROAD WITH FIVE OR MORE LANES, HIGH-CURVATURE CONTAINING ROAD, CONGESTION ROAD OF RESIDENTIAL AREA | | |
| REAL-TIME TRAFFIC CONDITION | | NONE | RUSH-HOUR CONGESTION AVERAGE SPEED EQUAL TO OR MORE THAN 40 KPM | RUSH-HOUR CONGESTION SITUATION EQUAL TO OR LESS | RUSH HOUR, EQUAL TO OR LESS THAN 20 KPM | ACCIDENT AHEAD WITHIN 1 KM |
| CURRENT WEATHER | | CLEAN | NIGHT OR CLOUD | SLIGHT RAIN AND SNOWY | PRECIPITATION > 20MM, SNOWFALL > 5CM | HEAVY RAIN, HEAVY SNOW |
| VEHICLE STATE | | | | CALIBRATION ERROR IN ONE OR MORE SENSORS | CALIBRATION ERROR IN TWO OR MORE SENSORS | SENSOR AND CONTROLLER ERROR |
| MAP MATCHING STATE | | LANDMARK MATCHING OF 95% OR MORE | LANDMARK MATCHING OF 90% OR MORE | | | |
| RISK ELEMENT | | | | ABNORMAL BEHAVIOR VEHICLE | PEDESTRIAN JAYWALKING | CRASH ACCIDENT |

FIG. 6

LEVEL-4 SECTION.
    RELAX COMFORTABLY FOR
    NEXT 20 MINUTES.

LEVEL-3 SECTION.
SWITCH CONTROL ONLY FOR UNEXPECTED SITUATION.
THIS VEHICLE DOES NOT SUPPORT AUTOMATIC LANE
CHANGE IN HIGHWAY. THE FREEWAY EXIT IS 3 KM
AHEAD. PLEASE, CHANGE LANES.

LEVEL-2 SECTION 5 KM AHEAD.
PREPARE FOR SWITCH CONTROL
AFTER 5 MINUTES.

LEVEL-3 SECTION.
PLEASE, LOOK FORWARD.
IF YOU DON'T LOOK FORWARD, AUTONOMOUS
DRIVING IS RELEASED AFTER 5 SECONDS.

ROAD WITH SERIOUS CURVATURE AHEAD.
PREPARE FOR SWITCH CONTROL.
5.4.3.2.1

FIG.7

AUTONOMOUS DRIVING CONTROL SYSTEM AND CONTROL METHOD USING THE SAME

CROSS-REFERENCE TO RELATED APPLICATION(S)

This application claims the benefit of Korean Patent Application No. 10-2017-0044015 filed on Apr. 5, 2017, which is hereby incorporated by reference as if fully set forth herein.

BACKGROUND

Field of the Invention

The present invention relates to a vehicle, and more particularly, to an autonomous driving control system and an autonomous driving control method using the same, for providing an available autonomous driving level and a recommendation function for each section to an autonomous vehicle.

Discussion of the Related Art

In general, an autonomous vehicle refers to a vehicle that is capable of sensing or detecting roads and the surrounding environment and driving autonomously toward a destination without driver manipulation of an accelerator, a handle, a brake, and so on. Examples of technologies for autonomous driving include adaptive cruise control (ACC) that is a type of advanced driver assistance system (ADAS). This technology refers to a system that calculates velocity, a distance to a preceding vehicle, and the like and maintains a constant distance between the vehicles. According to the technology, a vehicle has a function of being accelerated to desired velocity when there is no preceding vehicle and of adjusting velocity while maintaining a set distance when there is a slowly driving preceding vehicle.

There is a need for technological development such as a high-performance camera, a laser, and a collision avoidance system for autonomous driving and technology for overall determination and processing driving situation information and controlling cognition/response of a driving situation is necessary. However, when autonomous driving is partially used, information regarding an unexpected situation such as a vehicle that is suddenly detecting or a section in which autonomous driving is difficult is not capable of being provided to a driver and, thus, the driver has difficulty in immediately switching vehicle control to prevent an accident.

SUMMARY

Accordingly, the present invention is directed to an autonomous driving control system and a control method using the same that substantially obviates one or more problems due to limitations and disadvantages of the related art.

An object of the present invention is to provide an autonomous driving control system and an autonomous driving control method using the same, for providing an available autonomous driving level and surrounding environment for each path to a driver in real-time during autonomous driving to allow the driver to switch vehicle control to prepare for an unexpected situation, and so on.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an autonomous driving control method of a vehicle may include recognizing accuracy of a map provided in the vehicle and determining an available autonomous driving level, recognizing sensor coverage of the vehicle and determining an available autonomous driving level for each section among the available autonomous driving levels, recommending a path with an autonomous driving level indicated thereon among driving paths according to a destination set in the map, and updating autonomous driving level calculation information in real-time during driving along a selected path and providing autonomous information to a driver.

The recognizing of the accuracy of the map may include, determining the map as a navigation map when the accuracy of the map is greater than 3.0 m, determining the map as an ADAS map when the accuracy of the map is less than 1.0 m and greater than 0.3 m, and determining the map as a HD map when the accuracy of the map is less than 0.3 m. Additionally, the determining of the available autonomous driving level may include, determining that autonomous driving is possible up to a level-1 stage with respect to the navigation map, determining that autonomous driving is possible up to a level-2 stage with respect to the ADAS map, and determining that autonomous driving is possible up to a level-4 stage with respect to the HD map.

The autonomous driving level calculation information may include at least one of roadway curvature, a lane marking degree, an average traffic volume, an accident blackspot, crossroad complexity, total lane number, traffic light cognition, limited speed, road classification, a location cognition degree, road slope, and surrounding issues. The recognizing of the sensor coverage may include determining results of coverage of a front sensor, a front side sensor, a rear side sensor, and a rear sensor.

The autonomous driving level calculation may include at least one of map accuracy, sensor coverage, a real-time traffic condition, current weather, a vehicle state, a map matching state, and a risk element. The autonomous driving information provided to the driver may be provided as a minimum level value determined by synthesizing the autonomous driving level calculation information. The autonomous driving information provided to the driver may include at least one of a current level section and prior warning of control switch according to prediction of change in a level section.

In another aspect of the present invention, an autonomous driving control method of a vehicle may include identifying an available driving level based on a vehicle state to determine a recommendation level and recommending an available function for each section, recommending a path with an autonomous driving level indicated thereon among recommendation paths according to a destination, and updating level information for each section in real-time during driving along a selected path and providing level information and control switch information to a driver.

The updated information provided to a user may include at least one of a current level section and prior warning of control switch according to prediction of change in a level section. The updated level information may be provided as a minimum level value determined by synthesizing map accuracy, sensor coverage, a driving path, a real-time traffic condition, current weather, a vehicle state, a map matching state, and a risk element.

In another aspect of the present invention, an autonomous driving control method of a vehicle may include setting a driving destination in a map installed in the vehicle, determining accuracy of the map, recommending a driving path according to the destination and determining an available autonomous driving level based on the accuracy of the map, determining sensor coverage of the vehicle, determining a recommendation level among the available autonomous driving levels, and recommending an available function for each section, recommending a path with an autonomous driving level indicted thereon among recommendation paths according to the destination, and updating level information in real-time during driving along a selected path and providing the updated information to a driver.

The updated information provided to a user may include at least one of a current level section and prior warning of control switch based on a prediction of change in a level section. The updated level information may be provided as a minimum level value determined by synthesizing map accuracy, sensor coverage, a driving path, a real-time traffic condition, current weather, a vehicle state, a map matching state, and a risk element.

In another aspect of the present invention, an autonomous driving control system of a vehicle may include a map accuracy determiner configured to recognize accuracy of a map installed in the vehicle and to primarily determine an available autonomous driving level, a sensor coverage determiner configured to recognize sensor coverage of the vehicle and to secondarily determine an available function in the primarily determined available autonomous driving level, an autonomous driving state display configured to output a recommendation of a path with autonomous driving level indicated thereon among recommendation paths according to a destination set in the map, and a real-time information provider configured to update level information according to a path in real-time during driving along a selected path and to provide the updated information to a driver.

The map accuracy determiner may be configured to determine the map as a navigation map when the accuracy of the map is greater than 3.0 m, determine the map as an ADAS map when the accuracy of the map is less than 1.0 m and greater than 0.3 m, and determine the map as a HD map when the accuracy of the map is less than 0.3 m. Additionally, the determination of the available autonomous driving level may include, determining that autonomous driving is possible up to a level-1 stage with respect to the navigation map, determining that autonomous driving is possible up to a level-2 stage with respect to the ADAS map, and determining that autonomous driving is possible up to a level-4 stage with respect to the HD map.

The sensor coverage determiner may be configured to synthesize and determine results of coverage of a front sensor, a front side sensor, a rear side sensor, and a rear sensor. The level information updated in real-time may be provided as a minimum level value determined by synthesizing map accuracy, sensor coverage, a driving path, a real-time traffic condition, current weather, a vehicle state, a map matching state, and a risk element. The updated information provided to a user may include at least one of a current level section and prior warning of control switch according to prediction of change in a level section.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Elements in the following drawings may be exaggerated, omitted, or schematically illustrated for conveniences and clarity of explanation, and the sizes of elements do not accurately reflect their actual sizes. The same reference numerals designate the same elements throughout the specification.

Figure 1:
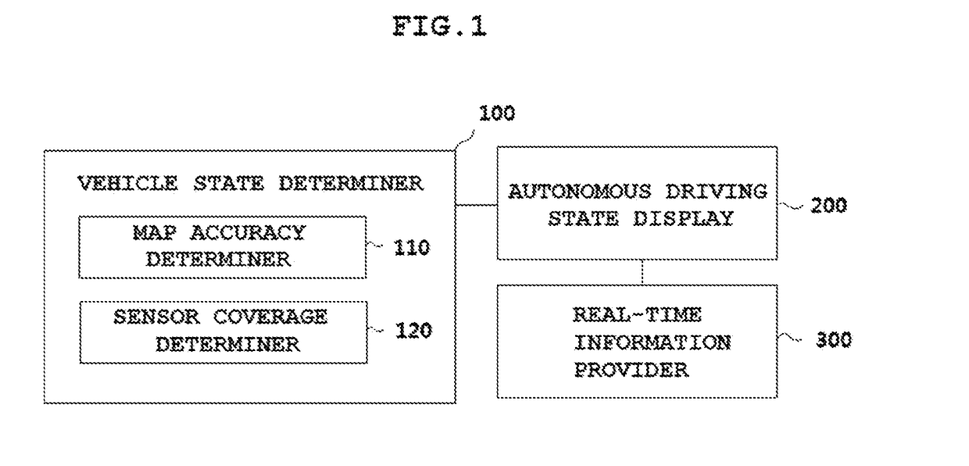
FIG. 1 is a schematic diagram illustrating a structure of an autonomous driving control system of a vehicle according to an exemplary embodiment of the present invention.
Figure 2:
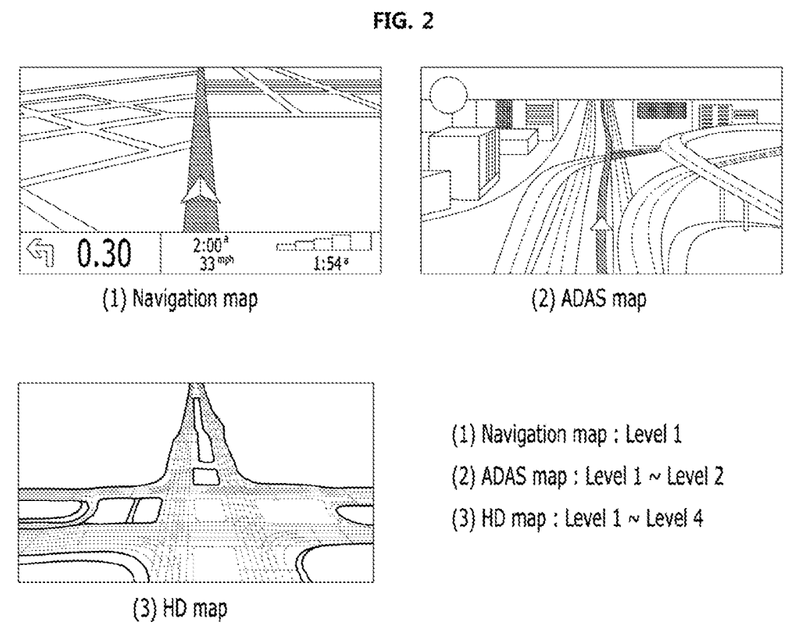
FIG. 2 shows an autonomous driving level range according to accuracy of a map according to an exemplary embodiment of the present invention.
Figure 3A:
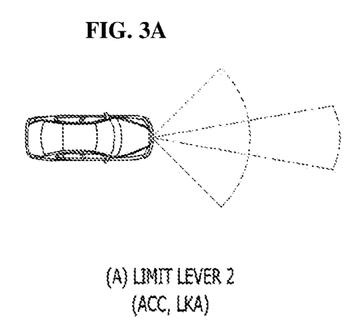
FIGS. 3A-3C show a recommended autonomous driving level and a use limit function according to sensor coverage according to an exemplary embodiment of the present invention.
Figure 3B:
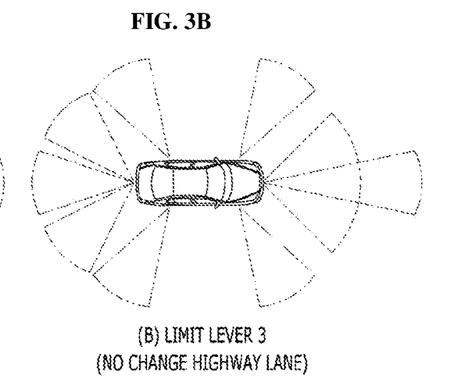
Figure 3C:
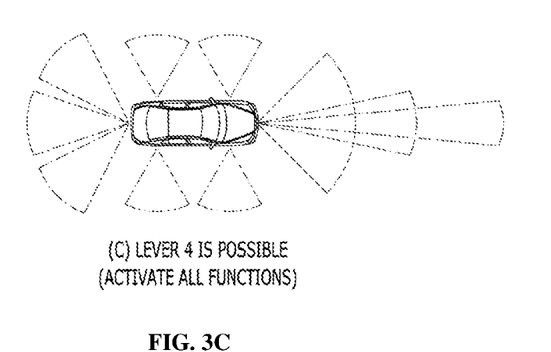
Figure 4:
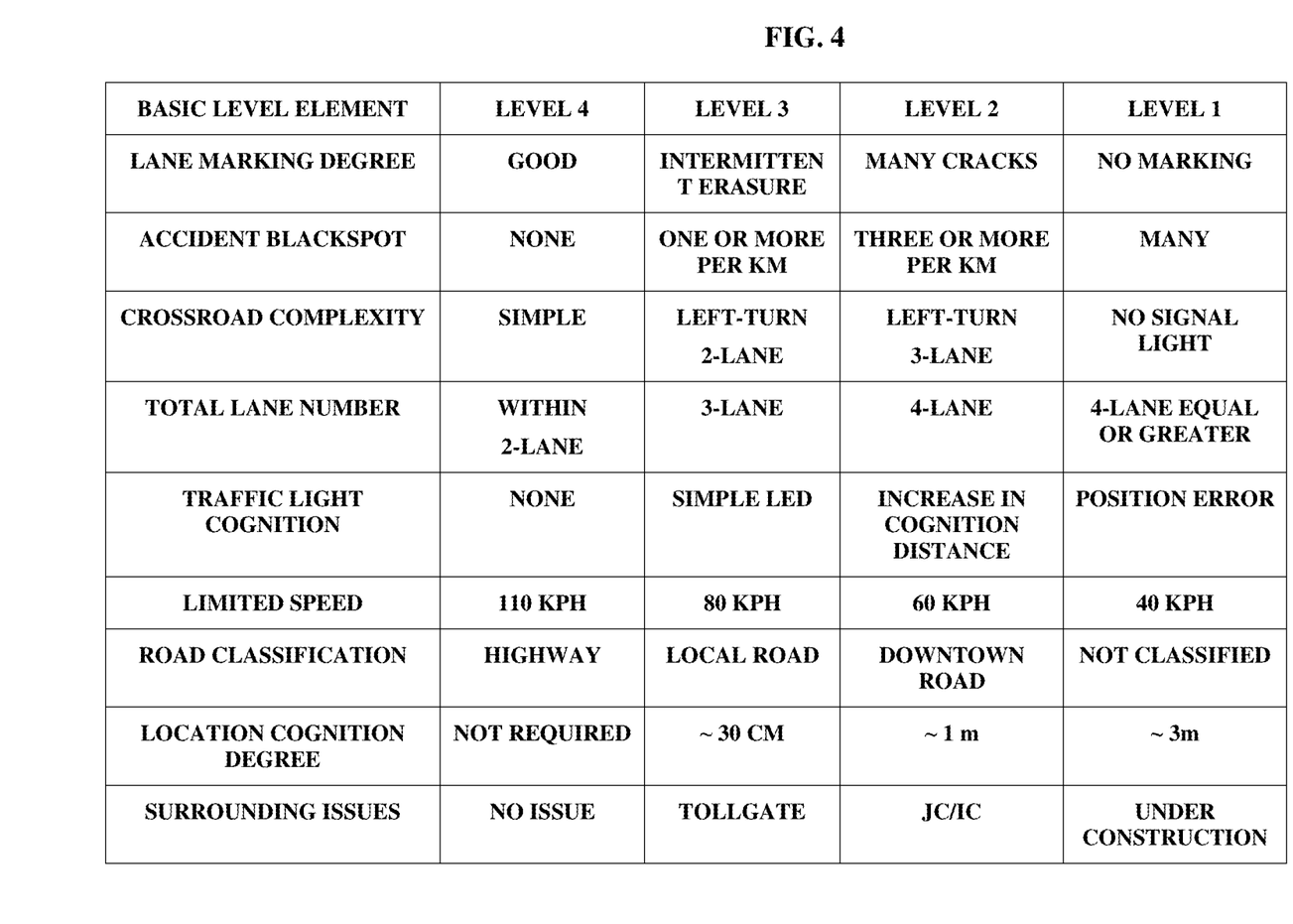
FIG. 4 is a table summarizing the standard for determining a driving level according to an exemplary embodiment of the present invention.
Figure 5:
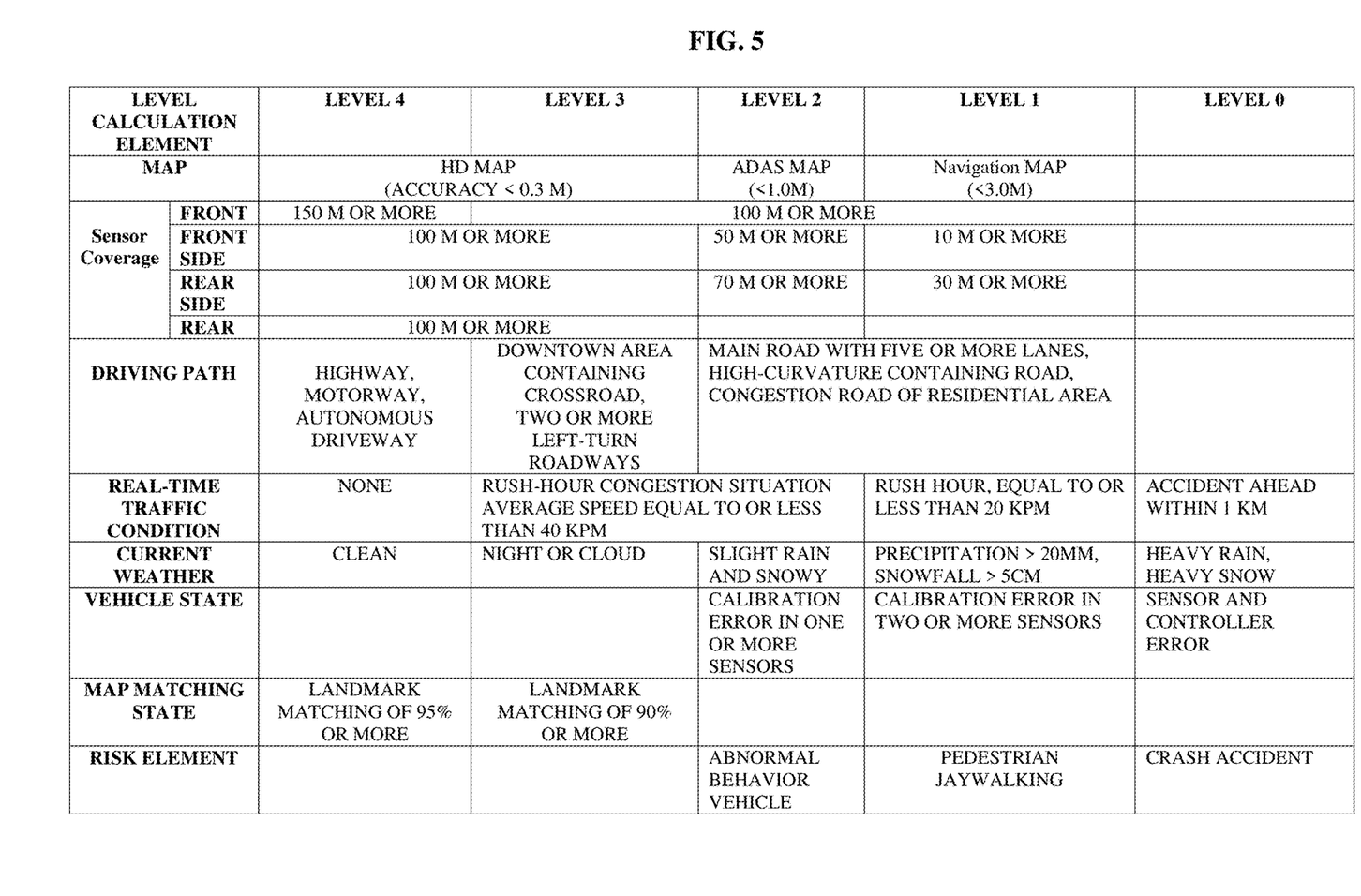
FIG. 5 is a table summarizing the standard for determining a driving level in real-time according to an exemplary embodiment of the present invention.
Figure 6:
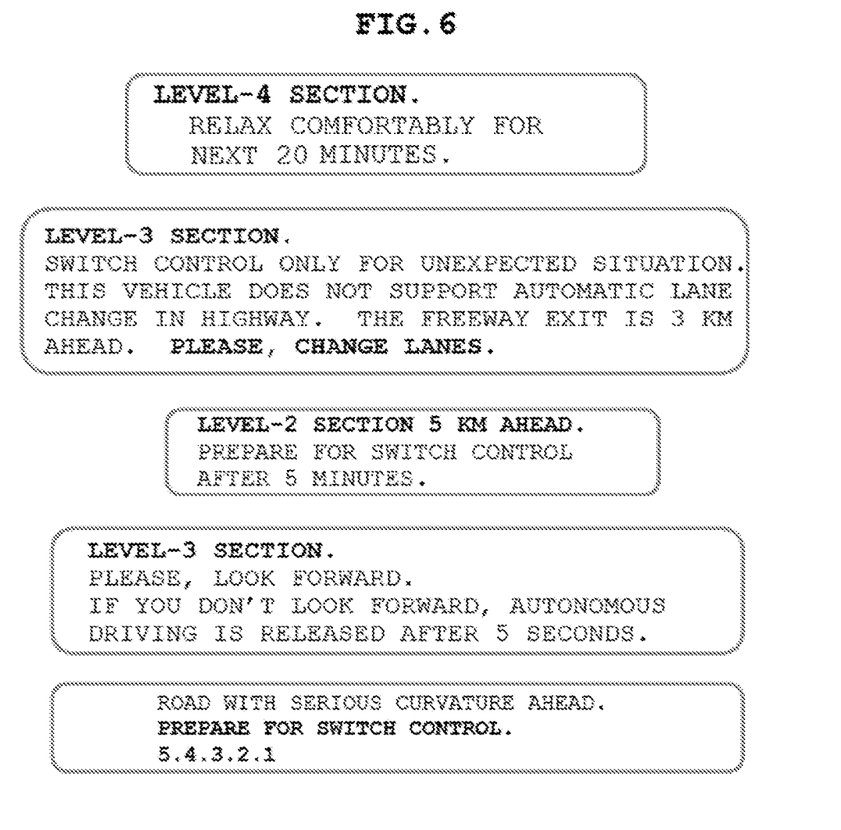
FIG. 6 shows information displayed to a driver by a real-time information provider according to an exemplary embodiment of the present invention.

FIG. 1 is a schematic diagram illustrating a structure of an autonomous driving control system of a vehicle according to an exemplary embodiment of the present invention. FIG. 2 shows an autonomous driving level range according to accuracy of a map. FIGS. 3A-3C show a recommended autonomous driving level and a use limit function according to sensor coverage. FIG. 4 is a table summarizing the standard for determining a driving level. FIG. 5 is a table summarizing the standard for determining a driving level in real-time. FIG. 6 shows information displayed to a driver by a real-time information provider.

As illustrated in FIG. 1, the autonomous driving control system of the vehicle according to the present exemplary embodiment may include a map accuracy determiner 110, a sensor coverage determiner 120, an autonomous driving state display 200, and a real-time information provider 300. The various components may be operated by a controller of the system having a processor and a memory. In particular, the map accuracy determiner 110 and the sensor coverage determiner 120 may constitute a vehicle state determiner 100 configured to detect a state of vehicle components (e.g., map and sensors) required for autonomous driving and determine and indicate a driving level and available autonomous driving functions.

The map accuracy determiner 110 may be configured to determine the accuracy of a map installed in the vehicle (e.g., a map displayed within a vehicle). The map may be any one of a navigation map, an advanced driver assistance system (ADAS) map, and a high definition map (HD) map. In particular, when the map accuracy is greater than 3.0 m, the map may be determined to be a navigation map, when the map accuracy is less than 1.0 m and greater than 0.3 m, the map may be determined to be an ADAS map, and when the map accuracy is less than 0.3 m, the map may be determined to be an HD map.

An available autonomous driving level (refer to the following standard) may be changed based on map accuracy. In other words, the available autonomous driving level and the available autonomous driving function may enhance performance in an order of a navigation map, an ADAS map, and an HD map, which are stated in an ascending order of map accuracy.

Reference-Classification Standard of Autonomous Vehicle of National Highway Traffic Safety Administration (NHTSA), US (1) Level-0 Stage (No-Automation Level)

This is a stage in which a driver turns a steering wheel, engages the brake pedal, and needs to look forward. The driver needs to completely control a vehicle.

(1) Level-1 Stage (Function-Specific Automation)

This is a stage in which a driver does not have to do one of right and left driving or forward and backward driving. The driver needs to look forward and should not operate other components or leave a driver seat.

(2) Level-2 Stage (Combined Function Automation)

This is a stage in which a driver does not have to perform both right and left driving and forward and backward driving. The driver needs to look forward and should not operate other components or leave a driver seat.

(3) Level-3 Stage (Limited Self-Driving Automation)

This is a stage in which looking forward as well as right and left driving or forward and backward driving is assigned to an autonomous vehicle by a driver. In some sections in which a current mode is converted into a safe autonomous mode, the driver is capable of operating other components or leaving a driver seat.

(4) Level-4 Stage (Full Self-Driving Automation)

This is a stage in which a vehicle is driven in a completely autonomous mode. A driver is capable of inputting a first destination and, then, is capable of operating other components or leaving a driver seat during driving.

As illustrated in FIG. 2, (1) navigation map, (2) ADAS map, and (3) HD map may have different map accuracy and, according to map accuracy, autonomous driving may be possible up to a level-1 stage of autonomous driving with respect to (1) navigation map, up to a level-2 stage with respect to (2) ADAS map, and up to level-3 or level-4 stage as well as level-1 and level-2 stages with respect to (3) HD map (a description of the level-0 stage that is substantially not an autonomous driving stage is omitted in the present exemplary embodiment).

Accordingly, an available autonomous driving level may be primarily determined according to map accuracy determined by the map accuracy determiner 110. When the available autonomous driving level is primarily determined by the map accuracy determiner 110, the sensor coverage determiner 120 may be configured to secondarily determine the available autonomous driving level and function.

The sensor coverage determiner 120 may be configured to determine coverage of sensors installed in the vehicle and secondarily determine the available autonomous driving level and the available functions (or limiting function). Particularly, the sensors, coverage of which is determined, may include a front sensor, a front side sensor, a rear side sensor, and a rear sensor. The sensor coverage determiner 120 may be configured to determine a result of the aforementioned coverage of sensors. For example, when coverage of the front sensor is a distance equal to or greater than about 100 m from a preceding vehicle and a surrounding environment, the available autonomous driving level may be determined among level-1 to level-3 stages and, when coverage of the front sensor is a distance equal to or greater than about 150 m from a preceding vehicle and a surrounding environment, the available autonomous driving level may be determined as a level-4 stage.

When coverage of the front side sensor is a distance equal to or greater than about 10 m and less than about 50 m from a preceding vehicle and a surrounding environment, the available autonomous driving level may be determined as the level-1 stage and, when coverage of the front side sensor is a distance equal to or greater than about 50 m and less than about 100 m from a preceding vehicle and a surrounding environment, the available autonomous driving level may be determined as the level-2 stage. In addition, when coverage of the front side sensor is a distance equal to or greater than about 100 m from a preceding vehicle and a surrounding environment, the available autonomous driving level may be determined among the level-3 to level-4 stages.

When coverage of the rear side sensor is a distance equal to or greater than about 30 m and less than about 70 m from a surrounding environment, the available autonomous driving level may be determined as the level-1 stage, when coverage of the rear side sensor is a distance equal to or greater than about 70 m and less than about 100 m from a surrounding environment, the available autonomous driving level may be determined as the level-2 stage. When coverage of the rear side sensor is a distance equal to or greater than about 100 m from a surrounding vehicle, the available autonomous driving level may be selected among level-3 to level-4 stages. In addition, when coverage of the rear side sensor is a distance equal to or greater than about 100 m from a surrounding environment, the available autonomous driving level may be determined as the level-4 stage.

The sensor coverage determiner 120 may be configured to determine a result of the aforementioned coverage of sensors to determine a secondary available autonomous driving level. First, an available autonomous driving level of the vehicle may be determined based on the available autonomous driving levels that are determined by the map accuracy determiner 110 and the sensor coverage determiner 120. For example, when the HD map is provided in the vehicle and the aforementioned coverage of sensors satisfies optimal standards, the vehicle may be determined to be capable of providing functions up to the level-4 stage of autonomous driving.

The autonomous driving state display 200 including the aforementioned map accuracy determiner 110 and the sensor coverage determiner 120 may be configured to pre-indicate an available autonomous driving level and autonomous driving functions, use of which is limited or recommended, with respect to a driver vehicle according to a map state and a sensor state. For example, as illustrated in FIG. 3A, the autonomous driving state display 200 may be configured to apply a determination result of sensor coverage during use of the level-2 stage of autonomous driving to indicate that an adaptive cruise control (ACC) function and a lane keep assist (LKA) function are limited.

Similarly, as illustrated in FIG. 3B, the autonomous driving state display 200 may be configured to output or indicate that a highway lane change function is not capable of being used in the level-3 stage and, as illustrated in FIG. 3C, may indicate that all functions are capable of being used in the level-4 stage. This indication may be, for example, displayed on the state. For example, only the available functions may be displayed or the available functions may be displayed in a different color than the unavailable functions. After the aforementioned procedure, the autonomous driving state display 200 may be configured display and recommend a path with an autonomous driving level indicated thereon among recommended paths according to a destination set on a map.

The autonomous driving state display 200 may be configured to display a path as an available driving level for each section through at least one of a roadway curvature, a lane marking degree, an average traffic volume, an accident blackspot, crossroad complexity, a total lane number, a traffic light cognition, limited speed, road classification, a location cognition degree, a road slope, and a surrounding issue, as illustrated in FIG. 4, but is not limited thereto. Each of the aforementioned items may be re-analyzed at a location where a vehicle is currently driven, a level stage may be displayed, and information may be displayed whenever a level is changed.

For example, when a section to a destination is a highway that has a satisfactory lane marking degree, has no accident blackspot, has a lane number less than two lanes in which a crossroad is not complex, and has a speed limit less than 110 km/h, the autonomous driving state display 200 may be configured to display that the vehicle is capable of being driven up to the level-4 stage, on a map. As another example, when a section to a destination is a four-lane road that has a plurality of cracks at lane marks and has three or more accident blackspots per km, the autonomous driving state display 200 may be configured to display that the vehicle is capable of being driven up to the level-2 stage, on the map.

The driver may be notified of available autonomous driving level stages for each section of a path toward a desired destination by pre-recommendation of the autonomous driving state display 200. For example, the autonomous driving state display 200 may be configured to recommend a path toward the destination from a starting place as a first path in the level-2 stage and a second path in the level-3 stage and the level-4 stage. The driver may select any one of the first path and the second path, set a desired level, and operate the vehicle in an autonomous driving mode.

For example, a driver needs to look forward or in a driving direction when operating the vehicle in a section of the level-2 stage in a map and control switch to the driver from the vehicle is capable of occurring anytime according to road and a surrounding environment. Accordingly, when the vehicle is driven during the present section, it may be necessary to indicate that only an adaptive cruise control (ACC) function is used if possible. Needless to say, when a traffic volume is increased, a driver may receive an indication that current technology is converted into traffic jam assistant (TJA) (e.g., autonomous driving in low speed congestion section) and a current stage is capable of being raised to the level-3 stage.

When the vehicle is driven in a section of the level-3 stage, the driver still needs to look forward or in a driving direction and it may be necessary to switch control within short period time of about 2 seconds due to an unexpected situation (e.g., another vehicle suddenly approaches or the like). When the vehicle is driven in a section of the level-4 stage, since the level-4 stage is a complete autonomous driving stage, the driver is not required to direct attention toward a driving direction and, thus, the possibility of control switch is low.

Accordingly, to enhance safety of autonomous driving, it may be necessary to pre-notify a driver of information regarding change in a level stage predicted during autonomous driving and to pre-notify the driver of information regarding vehicle control switch as necessary. Accordingly, the real-time information provider 300 according to the present exemplary embodiment may update autonomous driving level calculation information (level information) in real-time and provide the updated information to the driver during driving along a selected path.

In particular, the autonomous driving level calculation information (level information) may include at least one of map accuracy, sensor coverage, a driving path, a real-time traffic condition, current weather, a vehicle state, a map matching state, and a risk element, as illustrated in FIG. 5. The level information that is updated in real-time may be provided as a minimum level value by determining the overall autonomous driving level calculation information.

For example, when a driving path is a main road with five or more lanes, a high-curvature road, and a congested road of a residential area, an autonomous driving level may be determined among the level-1 stage to the level-2 stage. When the driving path is a downtown area containing a crossroad and two or more left-turn roadways, an autonomous driving level may be determined as a level-3 stage and, when the driving path is a highway (containing onramp), a motorway, and an autonomous driveway, the autonomous driving level may be determined as a level-4 stage.

As another example, when a real-time traffic condition is average speed equal to or less than about 20 km/h, an autonomous driving level may be determined as a level-1 stage and, when the real-time traffic condition is average speed greater than about 20 km/h and equal to or less than about 40 km/h, the autonomous driving level may be determined as a level-2 stage and a level-3 stage. Additionally, when current weather is a precipitation amount equal to or greater than about 20 mm and a snowfall amount equal to or greater than about 5 cm, the autonomous driving level may be determined as a level-1 stage, when the current weather is a precipitation amount less than about 20 mm and a snowfall amount less than about 5 cm, the autonomous driving level may be determined as a level-2 stage, when the current weather is night and cloudiness (e.g., low light conditions), the autonomous driving level may be determined as a level-3 stage, and when the current weather is clear (e.g., no clouds, rain, etc.), the autonomous driving level may be determined as a level-4 stage.

Furthermore, when a vehicle is in a state in which calibration error occurs in two or more sensors, the autonomous driving level may be determined as a level-1 stage and, when the vehicle is in a state in which calibration error occurs in one sensor, the autonomous driving level may be determined as a level-2 stage. When a map matching state is landmark matching equal to or greater than about 90% and less than about 95%, the autonomous driving level may be determined as a level-3 stage and, when the map matching state is landmark matching equal to or greater than about 95%, the autonomous driving level may be determined as a level-4 stage. Additionally, when a risk element is pedestrian jaywalking, the autonomous driving level may be determined as a level-1 stage and, when the risk element is abnormal surrounding vehicle behavior, the autonomous driving level may be determined as a level-2 stage.

The aforementioned items may be determined as a minimum level stage value by synthesizing and determining all factors. The updated information provided to a user by the real-time information provider 300 may include at least one of a current level section and prior warning of control switch according to prediction of change in a level section. The real-time information provider 300 may be configured to output the aforementioned information in the form of a voice message or visually and selectively or simultaneously display text, a figure, etc. on a display.

For example, as illustrated in FIG. 6, a driver may be notified of a current onramp section and a time point at which a level stage is terminated through "Level-4 section. Relax comfortably for the next 20 minutes". A driver may be warned of control switch through "Level-3 section. Switch control only for unexpected situation. This vehicle does not support automatic lane change in a highway. Freeway exit is 3 km ahead. Please, change lanes."

With regard to control switch, the driver may be warned of the time or situations through "Level-2 section 5 km ahead. Prepare to switch control after 5 minutes" and "Road with serious curvature ahead. Prepare to switch control. 5.4.3.2.1". In addition, when a driver is detected to not be looking in a driving direction based on monitoring of a forward-looking state of the driver using an indoor imaging device (e.g., camera, video camera or the like), the driver may be warned through "Level-3 section. Please, look forward. If you don't look forward, autonomous driving will be released after 5 seconds".

Accordingly, when the autonomous driving control system of the vehicle according to the present exemplary embodiment is used, situation information regarding predicted change in level stage and vehicle control switch information in real-time during autonomous driving may be pre-signaled in real-time to the driver, the driver may prepare for an unexpected situation and receive control (e.g., control right of the vehicle instead of the controller operating the vehicle) at an appropriate time point to safely drive the vehicle.

Figure 7:
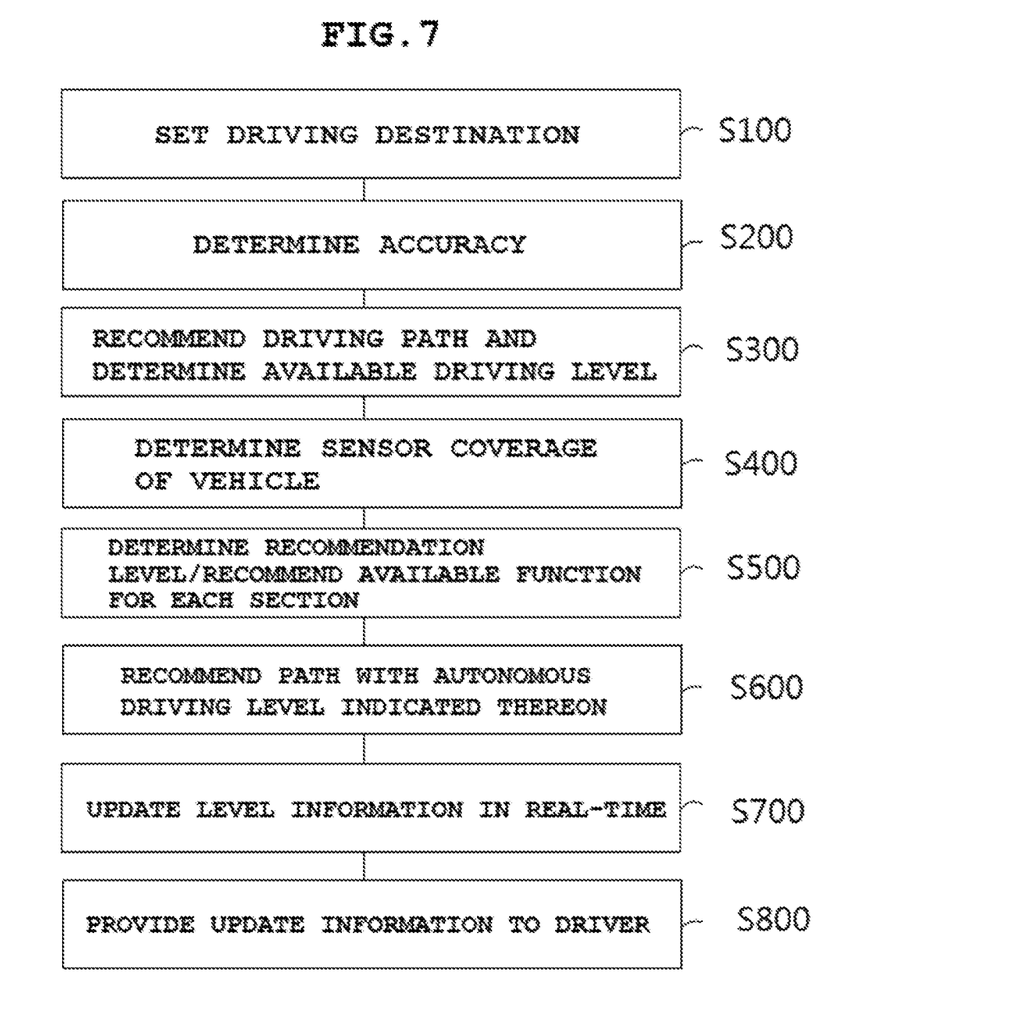
FIG. 7 is a flowchart illustrating a control method of autonomous driving of a vehicle according to an exemplary embodiment of the present invention.

FIG. 7 is a flowchart illustrating a control method of autonomous driving of a vehicle according to an exemplary embodiment of the present invention. Hereinafter, the control method of autonomous driving of a vehicle according to an exemplary embodiment of the present invention will be described with reference to FIG. 7 and the above drawings. The method described herein below may be executed by the controller.

As illustrated in FIG. 7, the control method of autonomous driving of a vehicle according to the present embodiment may include setting (S100) a driving destination in a map within a vehicle by the driver. Then, determining (S200) of accuracy of the map installed in the vehicle may be performed. The present operation may be performed by the map accuracy determiner 110 in the aforementioned autonomous driving control system. Autonomous driving may be possible up to a level-1 stage with respect to a navigation map installed within the vehicle, up to a level-2 stage with respect to an ADAS map, and level-3 or level-4 stage as well as level-1 and level-2 stages with respect to an HD map.

A driving path may be recommended or output on a display and an available driving level may be determined according to map accuracy determined by the map accuracy determiner 110 (S300), that is, an available autonomous driving level may be primarily determined. When the available autonomous driving level is primarily determined by the map accuracy determiner 110, determining (S400) of sensor coverage of the vehicle may be performed.

In the determining of the sensor coverage (S400), the available autonomous driving level and an available function for each section may be determined to be recommended by the aforementioned sensor coverage determiner 120 (S500). The sensor coverage determiner 120 may be configured to determine coverage of sensors installed within the vehicle and secondarily determine the available autonomous driving level. In particular, the sensors, coverage of which is determined, may include a front sensor, a front side sensor, a rear side sensor, and a rear sensor. The sensor coverage determiner 120 may be configured to determine a result of the aforementioned coverage of sensors. The aforementioned example has been described already and, thus is not described herein.

First, an available autonomous driving level of the vehicle may be determined based on the available autonomous driving levels that are determined by the map accuracy determiner 110 and the sensor coverage determiner 120 that perform the aforementioned operations. After the aforementioned procedure, the autonomous driving state display 200 may be configured to recommend and display a path with an autonomous driving level indicated thereon among recommended paths according to a destination set in a map (S700). The driver may be notified of available autonomous driving level stages for each section of a path on a desired destination by pre-recommendation of the autonomous driving state display 200. The driver may select any one of the recommended paths, set a desired level, and drive the vehicle in an autonomous driving mode.

However, it is necessary to switch (transmit) control from the vehicle by the driver according to change in autonomous driving level for each path section (e.g., switching the vehicle operation control between a driver and a controller within the vehicle) and, thus, it may be necessary to pre-notify the driver of situation information regarding predicted change in level stage during autonomous driving to enhance safety of autonomous driving and it may be necessary to notify the driver of information regarding vehicle control switch as necessary.

Accordingly, after the aforementioned operation, level and surrounding environment information may be updated in real-time (S700). The present operation may be performed by the real-time information provider 300. The real-time information provider 300 may be configured provide level information in real-time during driving along a selected path and provide the updated information to the driver (S800). Particularly, the level information updated in real-time may be provided as a minimum level value by overall determining map accuracy and sensor coverage, a driving path, a real-time traffic condition, current weather, a vehicle state, a map matching state, and a risk element.

The updated information provided to a user by the real-time information provider may include at least one of a current level section and prior warning of control switch according to prediction of change in a level section. The real-time information provider may be configured to output the aforementioned information in the form of a voice message or visually and selectively or simultaneously display a text, a figure, etc. on a display.

For example, as illustrated in FIG. 6, a driver may be notified of a current onramp section and a time point at which a level stage is terminated through "Level-4 section. Relax comfortably for the next 20 minutes". For example, a driver may be warned of control switch through "Level-3 section. Switch control only for unexpected situation. This vehicle does not support automatic lane change in a highway. Freeway exit is 3 km ahead. Please, change lanes".

With regard to control switch, the driver may be warned of the time or situations through "Level-2 section 5 Km ahead. Prepare to switch control after 5 minutes" and "Road with serious curvature ahead. Prepare to switch control. 5.4.3.2.1.". In addition, when a driver is determined not to be looking in a driving direction by monitoring a forward looking state of the driver using an indoor imaging device (e.g., a camera, video camera, etc.), the driver may be warned through "Level-3 section. Please, look forward. If you don't look forward, autonomous driving is released after 5 seconds."

Accordingly, when the control method of autonomous driving of a vehicle according to the present exemplary embodiment is used, situation information regarding predicted change in level stage and vehicle control switch information in real-time during autonomous driving may be pre-signaled in real-time to the driver, the driver may prepare for an unexpected situation and receive control to operate the vehicle at an appropriate time point to safely drive the vehicle.

When the autonomous driving control system of the vehicle and the control method of autonomous driving of a vehicle according to the present invention are used, situation information regarding predicted change in level stage and vehicle control switch information in real-time during autonomous driving may be pre-signaled in real-time to the driver, the driver may prepare for an unexpected situation and receive control to operate the vehicle at an appropriate time point to safely drive the vehicle.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. An autonomous driving control method of a vehicle having an autonomous driving control system, the autonomous driving control system comprising a map accuracy determiner, a sensor coverage determiner, an autonomous driving state display, and a real-time information provider, the method comprising:
   recognizing, by the map accuracy determiner, accuracy of a map within the vehicle and determining an available autonomous driving level based on the accuracy of the map;
   recognizing, by the sensor coverage determiner, sensor coverage of the vehicle and determining an available autonomous driving level for each section among the available autonomous driving levels;
   recommending, by the autonomous driving state display, a path with an autonomous driving level indicated thereon among driving paths according to a destination set in the map; and
   updating, by the real-time information provider, autonomous driving level calculation information in real-time during driving along a selected path and providing autonomous information to a driver.

2. The method according to claim 1, wherein:
   the recognizing of the accuracy of the map includes, determining, by the controller, the map as a navigation map when the accuracy of the map is greater than about 3.0 m, determining the map as an advanced driver assistance system (ADAS) map when the accuracy of the map is less than about 1.0 m and greater than about 0.3 m, and determining the map as a high definition (HD) map when the accuracy of the map is less than about 0.3 m; and
   the determining of the available autonomous driving level includes, determining, by the controller, that autonomous driving is possible up to a level-1 stage with respect to the navigation map, determining, by the controller, that autonomous driving is possible up to a level-2 stage with respect to the ADAS map, and determining, by the controller, that autonomous driving is possible up to a level-4 stage with respect to the HD map.

3. The method according to claim 1, wherein the autonomous driving level calculation information includes at least one selected from the group consisting of: roadway curvature, a lane marking degree, an average traffic volume, an accident blackspot, crossroad complexity, total lane number, traffic light cognition, limited speed, road classification, a location cognition degree, road slope, and surrounding issues.

4. The method according to claim 3, wherein the recognizing of the sensor coverage includes determining, by the controller, results of coverage of a front sensor, a front side sensor, a rear side sensor, and a rear sensor.

5. The method according to claim 1, wherein the autonomous driving level calculation includes at least one selected from the group consisting of: map accuracy, sensor coverage, a real-time traffic condition, current weather, a vehicle state, a map matching state, and a risk element.

6. The method according to claim 5, wherein the autonomous driving information provided to the driver is provided as a minimum level value determined by synthesizing the autonomous driving level calculation information.

7. The method according to claim 6, wherein the autonomous driving information provided to the driver includes at least one of a current level section and prior warning of control switch based on prediction of change in a level section.

8. An autonomous driving control method of a vehicle having an autonomous driving control system, the autonomous driving control system comprising an autonomous driving state display and a real-time information provider, the method comprising:
   identifying, by the autonomous driving state display, an available driving level according to a state of the vehicle to determine a recommendation level and recommending an available function for each section;
   recommending, by the autonomous driving state display, a path with an autonomous driving level indicated thereon among recommendation paths according to a destination; and
   updating, by the real-time information provider, level information for each section in real-time during driving along a selected path and providing level information and control switch information to a driver.

9. The method according to claim 8, wherein the updated information provided to the driver includes at least one of a current level section and prior warning of control switch based on a prediction of change in a level section.

10. The method according to claim 9, wherein the updated level information is provided as a minimum level value determined by synthesizing map accuracy, sensor coverage, a driving path, a real-time traffic condition, current weather, a vehicle state, a map matching state, and a risk element.

11. An autonomous driving control method of a vehicle having an autonomous driving control system, the autonomous driving control system comprising a map accuracy determiner, a sensor coverage determiner, an autonomous driving state display, and a real-time information provider, the method comprising:
   setting, by the map accuracy determiner, a driving destination in a map within the vehicle based on a received destination input;
   determining, by the map accuracy determiner, accuracy of the map;
   recommending, by the map accuracy determiner, a driving path according to the destination and determining an available autonomous driving level according to the accuracy of the map;
   determining, by the sensor coverage determiner, sensor coverage of the vehicle, determining a recommendation level among the available autonomous driving levels, and recommending an available function for each section;
   recommending, by the autonomous driving state display, a path with an autonomous driving level indicted thereon among recommendation paths according to the destination; and
   updating, by the real-time information provider, level information in real-time during driving along a selected path and providing the updated information to a driver.

12. The method according to claim 11, wherein the updated information provided to a user includes at least one of a current level section and prior warning of control switch based on a prediction of change in a level section.

13. The method according to claim 12, wherein the updated level information is provided as a minimum level value determined by synthesizing map accuracy, sensor coverage, a driving path, a real-time traffic condition, current weather, a vehicle state, a map matching state, and a risk element.

14. An autonomous driving control system of a vehicle, comprising:
   a map accuracy determiner configured to recognize accuracy of a map within the vehicle and to primarily determine an available autonomous driving level based on the accuracy of the map;
   a sensor coverage determiner configured to recognize sensor coverage of the vehicle and to secondarily determine an available function in the primarily determined available autonomous driving level;
   an autonomous driving state display configured to recommend a path with autonomous driving level indicated thereon among recommendation paths according to a destination set in the map; and
   a real-time information provider configured to update level information according to a path in real-time during driving along a selected path and to provide the updated information to a driver.

15. The system according to claim 14, wherein the map accuracy determiner is configured to determine the map as a navigation map when the accuracy of the map is greater than about 3.0 m, determines the map as an advanced driver assistance system (ADAS) map when the accuracy of the map is less than about 1.0 m and greater than about 0.3 m, and determines the map as a high definition (HD) map when the accuracy of the map is less than about 0.3 m; and
   the determining of the available autonomous driving level includes, determining that autonomous driving is possible up to a level-1 stage with respect to the navigation map, determining that autonomous driving is possible up to a level-2 stage with respect to the ADAS map, and determining that autonomous driving is possible up to a level-4 stage with respect to the HD map.

16. The system according to claim 15, wherein the sensor coverage determiner is configured to synthesize and determine results of coverage of a front sensor, a front side sensor, a rear side sensor, and a rear sensor.

17. The system according to claim 16, wherein the level information updated in real-time is provided as a minimum level value determined by synthesizing map accuracy, sensor coverage, a driving path, a real-time traffic condition, current weather, a vehicle state, a map matching state, and a risk element.

18. The system according to claim 17, wherein the updated information provided to a user includes at least one of a current level section and prior warning of control switch based on a prediction of change in a level section.

* * * * *